March 16, 1954

W. C. MILSTEAD 2,672,265

RACK FOR ATTACHMENT TO VEHICLES

Filed May 15, 1951

INVENTOR.
W. C. MILSTEAD
BY
A. Yates Dowell
ATTORNEY

Patented Mar. 16, 1954

2,672,265

UNITED STATES PATENT OFFICE 2,672,265

RACK FOR ATTACHMENT TO VEHICLES

William C. Milstead, Waco, Tex.

Application May 15, 1951, Serial No. 226,485

3 Claims. (Cl. 224—42.45)

This invention relates to supports and more particularly to a rack adapted to be attached to vehicles for supporting elongated articles such as pipes, lumber and other similar articles.

Pipe racks for similar purposes have commonly been provided on trucks and other vehicles for use by plumbers, carpenters and other craftsmen who are required to transport relative long articles to and from the jobs on which they are working. These racks previously used have had many disadvantages, since many of these were necessarily permanently attached to the vehicle, or, if temporarily attached, were not sufficiently rigid to support the load, or were loose thus producing a great deal of noise. Other racks of a detachable nature required substantial alteration or addition to the vehicle to provide a rigid and substantial structure.

One object of the present invention is to overcome the disadvantages enumerated above and to provide a pipe rack which is readily installed and easily removed, but still furnishes a sturdy and rigid rack, when it is mounted on a vehicle body.

A further object of the invention is to provide a pipe rack which requires no alteration of the vehicle body, and the only portion thereof which is permanently attached to the vehicle provides a smooth sturdy grill guard to protect the front end of the vehicle.

A still further object of the present invention is the provision of a pipe rack comprising a front rack having a rigid framework which may be secured to the front end of the vehicle frame and is adapted to detachably mount a pair of outwardly extending arms and one or more identical rear racks which are adapted to be inserted in the stake wells and rest on the flange of the truck body in such a manner as to prevent the rear racks from twisting and turning thus providing two or more aligned supports on each side of the vehicle body for any elongated articles which it may be desired to transport thereon.

Figure 1:
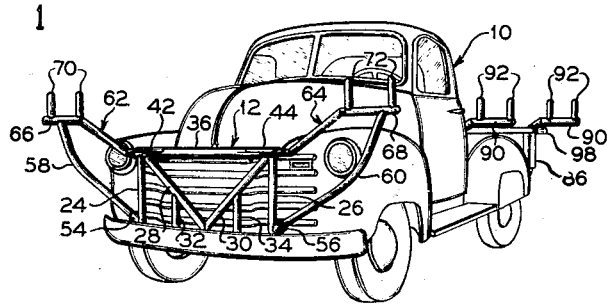
Figure 2:
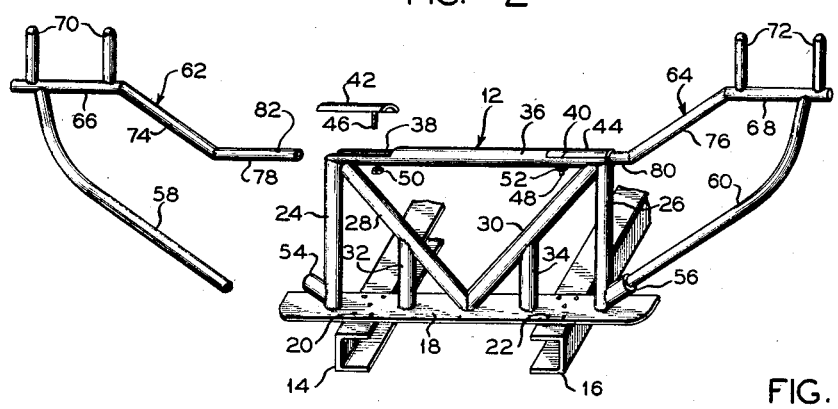
Figure 3:
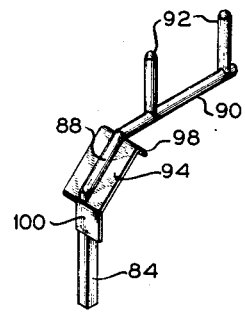
Figure 4:
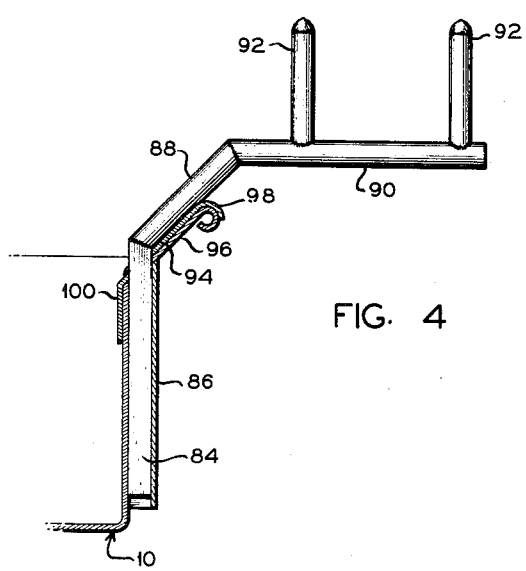

Further objects and advantages of the invention will be apparent from the following description taken in conjunction with the drawings, wherein:

Fig. 1 is a perspective view of one preferred application of the present invention showing a pick-up truck provided with front and rear pipe racks constructed in accordance with one preferred form of the present invention;

Fig. 2 an enlarged perspective view of the front rack shown in Fig. 1 illustrating the manner in which it is attached to the front end of the vehicle frame and showing one arm detached from the rigid framework;

Fig. 3 an enlarged perspective view of one of the rear racks shown in Fig. 1; and, Fig. 4 a further enlarged view of the rear racks shown in Fig. 3 positioned in the stake well of the vehicle body and resting on the sloping flange with the stake well and the flange being shown in section.

Referring now to the drawings in detail a pipe rack constituting one preferred form of the present invention is shown in Fig. 1 adapted for use on a conventional pick-up truck 10 which is commonly used by plumbers, carpenters and other craftsmen in transporting their tools and supplies to and from the jobs on which they are working.

The front rack which is shown in more detail in Fig. 2 consists of a rigid framework 12 which is secured to the front end of the two channel members 14 and 16 which form a part of the conventional vehicle frame by means of a flat horizontal member 18 which may be rigidly secured to the members 14 and 16 as by spot welding indicated at 20 and 22, or, if desired, member 18 may be detachably secured by bolts (not shown). Framework 12 further consists of outer upright members 24 and 26, diagonal braces 28 and 30 and a pair of shorter upright members 32 and 34 which extend between the member 18 and the respective diagonal members 28 and 30.

A horizontal tubular member 36 extends transversely and is supported across the upper ends of the members 24, 26, 28 and 30 and is cut-away at each end to provide recesses indicated at 38 and 40 to receive a pair of semi-cylindrical caps 42 and 44. Each of the caps are provided with a bolt 46 and 48 respectively which are adapted to extend through suitable openings (not shown) in the lower portion of the tubular member 36 and are secured in position by nuts 50 and 52. The upright members 24 and 26 have secured thereto tubular sockets 54 and 56 which extend upwardly and outwardly from the lower portion thereof and are adapted to receive the lower ends of the diagonally curved struts 58 and 60 on the respective arms 62 and 64.

Each of the arms 62 and 64 are identical in construction and have horizontal supports 66 and 68 which are secured to the upper ends of the struts 58 and 60 respectively and provide a support for the articles carried on the racks. Both of the supports 66 and 68 are provided with a pair of upwardly extending prongs 70 and 72 which prevent the articles from sliding sideways and which may be utilized in lashing the articles to the rack. Diagonal portions 74 and 76 extend downwardly and inwardly from the supports 66 and 68 to horizontal portions 78 and 80 which are adapted to seat in the recesses 38 and 40 and are provided with openings one of which is shown on portion 78 at 82. These openings receive the bolts 46 and 48 for securing the arms rigidly in position, when the members 58 and 60 have been inserted in the sockets 54 and 56 and the horizontal portions 78 and 80 rest in the recesses 38 and 40.

It will be obvious that this arrangement provides a sturdy, rigid and substantial structure which can be readily set up and easily taken apart by removing the arms 62 and 64 with the framework 12 in either case providing an effective grill guard to protect the front end of the vehicle.

The removable rear pipe racks are all identical in construction and may be interchangeably used in any one of the stake wells on the pick-up truck body shown. Each of the rear racks consists of a rectangular upright portion 84 which slides snugly into the stake well 86, as shown in Fig. 4, and is connected to a diagonal portion 88 which extends upwardly and outwardly to a horizontal support 90 provided with a pair of upright prongs 92 which are similar in construction and use to the prongs 70 and 72 on the forward rack.

Plate 94 is secured to the underside of the diagonal portion 88 and is adapted to rest against the inclined flange 96 of the truck body. Plate 94 is provided with a curved flange 98 which engages over the edge of flange 96 and is also provided with a downwardly extending portion 100 which is positioned in spaced parallel relation to the upright portion 84 and engages the inner surface of the truck body. The plate 94 distributes the load over the body flange 96 and the curved flange 98 and the portion 100 keeps the twisting or turning of the rear rack to a minimum.

As shown in Fig. 1 of the drawings two rear racks may be used on each side of the pick-up truck, or, if desired, only one or more than two may be used depending on the length and weight of the material or articles to be carried on the racks.

It will be apparent that if desired only one of the arms 64 may be used in conjunction with one or more of the rear racks on only one side of the vehicle body. The structure shown can obviously be modified and adapted to different types of truck bodies, and, if it were found desirable to provide a pipe carrying rack on passenger vehicles, a rear rack might be provided similar to the front rack shown and attached to the after end of the vehicle frame in a similar manner.

It will be obvious to those skilled in the art that various changes may be made in the invention, without departing from the spirit and scope thereof, and therefore the invention is not limited by that which is shown in the drawings and described in the specification, but only as indicated in the appended claims.

I claim:

1. A rack for attachment to a vehicle comprising a framework having a horizontal member adapted to be rigidly secured to the front end of the vehicle frame, upright members secured adjacent the outer ends of said horizontal member, and a horizontal tubular member extending across the upper ends of said upright members and secured thereto, said tubular member having the upper part of its end portions cut away to form recesses, and tubular sockets inclined upwardly and outwardly from the lower portion of said upright members; a pair of arms each having a horizontal portion adapted to seat in one of said recesses, a diagonal strut adapted to engage in one of said sockets, a horizontal support rigidly connected to said horizontal portion and said diagonal strut, and a pair of spaced prongs extending upwardly from each of said horizontal supports; and a pair of end caps each having securing means extending through the horizontal portion on one of said arms and through one of the end portions of said horizontal tubular member for detachably securing said arms in rigid outwardly extending relation to said framework.

2. A rack for attachment to a vehicle comprising a framework adapted to be rigidly secured to the front end of the vehicle frame said framework having a horizontal member, upright members secured on said horizontal member adjacent the outer ends thereof, a transverse member secured across the upper ends of said upright members, said transverse member having recesses formed in its end portions, and tubular sockets inclined upwardly and outwardly from the lower portion of said upright members; a pair of arms each having a portion adapted to seat in one of said recesses, diagonal members adapted to engage in said sockets, a support rigidly connected to said horizontal portion and said diagonal member, and a pair of spaced prongs extending upwardly from said support; a pair of end caps having securing means extending through the horizontal portions on said arms and through the end portions of said horizontal tubular member for detachably securing said arms in rigid outwardly extending relation to said framework.

3. A rack for attachment to a vehicle comprising an upright framework adapted to be rigidly secured to the front end of the vehicle frame, said framework having recesses formed in the upper part of its end portions, and tubular sockets inclined upwardly and outwardly from the lower portion of said framework; a pair of arms each having a portion adapted to seat in one of said recesses, a member adapted to engage in one of said sockets, a support rigidly connected to said portion and said member; a pair of end caps having securing means extending through the portions on said arms and through the end portions of said framework for detachably securing said arms in rigid outwardly extending relation to said framework.

WILLIAM C. MILSTEAD.

References Cited in the file of this patent

UNITED STATES PATENTS

| Number | Name | Date |
|---|---|---|
| 1,295,806 | Shuler et al. | Feb. 25, 1919 |
| 1,562,808 | Thompson | Nov. 24, 1925 |
| 1,633,497 | Schoelerman | June 21, 1927 |
| 2,233,273 | Di Vincenzo | Feb. 25, 1941 |
| 2,570,802 | Hatteburg | Oct. 9, 1951 |